United States Patent [19]

Goudy

[11] Patent Number: 5,180,203

[45] Date of Patent: Jan. 19, 1993

[54] TRUCK BOX TARPAULIN ASSEMBLY

[76] Inventor: John W. Goudy, P.O. Box 2199, Drumheller, Alberta, Canada, T0J 0Y0

[21] Appl. No.: 894,459

[22] Filed: Jun. 5, 1992

[51] Int. Cl.⁵ .............................................. B60J 11/00
[52] U.S. Cl. ....................................... 296/98; 296/100
[58] Field of Search ................................... 296/98, 100

[56] References Cited

U.S. PATENT DOCUMENTS

| | | | |
|---|---|---|---|
| 4,302,043 | 11/1981 | Dimmer et al. | 296/98 |
| 4,505,512 | 3/1985 | Scheichel et al. | 296/98 |
| 4,518,193 | 5/1985 | Heider et al. | 296/98 |
| 4,691,957 | 9/1987 | Ellingson | 296/98 |

FOREIGN PATENT DOCUMENTS 2517269  6/1983  France ............................ 296/100

Primary Examiner—Margaret A. Focarino
Assistant Examiner—Gary C. Hoge
Attorney, Agent, or Firm—Fields, Lewis, Pittenger & Rost

[57] ABSTRACT

The roller of a truck box roller tarp assembly is equipped with dependent loops of chain at spaced intervals along its length. Brackets, forming hooks, are secured to the truck box at a common elevation along one side. When the tarp is closed over the box opening, the roller loops hang below the hooks. The roller may be reverse rolled, using the conventional crank, to climb the tarp and bring the loops into engagement with the hooks. The now-constrained roller may be further reverse rolled, to tighten the tarp. The roller is then locked up by securing the crank to the truck box in conventional fashion.

1 Claim, 3 Drawing Sheets

TRUCK BOX TARPAULIN ASSEMBLY

FIELD OF THE INVENTION

This invention relates to an assembly for use in rolling or unrolling a tarpaulin to open or close the opening of an open-topped box, such as that of a truck or truck trailer.

BACKGROUND OF THE INVENTION

The present invention is a modification of a known assembly commonly known in the trade as a "roller tarp". Relevant examples of roller tarp assemblies are disclosed in U.S. Pat. No. 4,302,043, issued to J. R. Dimmer et al, and Canadian patent 1,132,168, issued to W. Michel.

These conventional roller tarp assemblies involve the following:

A rectangular tarpaulin;

The tarpaulin being secured along one side edge to a first side wall of the truck box;

The other side edge of the tarpaulin being secured to an elongate roller extending the length of the box;

The box having a support track frame extending laterally across the box opening, for supporting the roller as it moves across the opening. Typically one might have end frames, supported by the box end walls, a ridge pole bridging longitudinally between the end frames, and laterally extending, spaced apart hoops bridging the box side walls and ridge pole;

A universal joint, splined to the rear end of the roller, and a long crank connected to the universal joint to form a crank assembly, whereby a person standing on the ground may manually wind the roller using the crank assembly, to cause it to roll up or unroll the tarpaulin, thereby opening or closing the box opening; and Means for enabling further tensioning of the tarpaulin, said means being operative to cooperate with the crank assembly to look up the roller when the opening is covered, so that a taut and continuing closure of the box may be achieved. In the Dimmer et al and Michel patents, such means comprise an elongated ledge, extending the length of the box. The ledge is mounted to the second 14 side wall of the box along its top edge and extends outwardly and slightly downwardly. The tarpaulin is sized so that, when it is fully unrolled, the roller hangs alongside the box side wall, just beneath the ledge. The roller can then be reverse-rolled to cause it to climb the tarpaulin and become trapped beneath the ledge. The roller is now restrained against further upward movement but it can still be reverse-rolled a further small amount, to wrap on more tarpaulin and tension it, so that it is taut across the box opening. The crank assembly may then be bent at the universal joint and the crank is secured flat against the box side or end wall by engagement with a suitable bracket. At this stage, the roller is looked against rotation because the crank assembly joined to it is fixed to the box, the tarpaulin is extended to cover the box opening, and the tarpaulin is pulled taut and close-fitting to the support track frame.

Now, there are disadvantages associated with the prior art system of trapping the reverse-rolled roller. The ledge itself is expensive, as it is usually fabricated from corrosion-resistant aluminum. Due to its protruding arrangement, it often is damaged by the blows and impacts to upper rim of the truck box that truck boxes commonly undergo. If damaged, the entire ledge must be removed and replaced. If the box is not completely square, there is no adjustment for front and back differential tension. And finally, parts cannot be quickly replaced or repaired by the owner.

SUMMARY OF THE INVENTION

In accordance with the present invention, an improved roller tarp assembly is provided. In this connection, a plurality of hooks are mounted to the second side wall of the at points spaced along its length. The hooks are vertically positioned, so that the entry opening of the hook is downwardly A plurality of loops are fixed to and suspended from the roller, so as to depend downwardly therefrom at points spaced along its length. The loops are located to correspond with the The tarpaulin is sized so that, when fully unrolled, the roller is positioned alongside the second side wall of the box and is in close proximity to the hooks. The loops are of sufficient length so as to extend below the hooks when the roller is so positioned.

As a result of this arrangement, the roller may be reverse-rolled, one the tarpaulin is fully unrolled, to raise the loops into engagement with the hooks. The roller may be further wound a small amount with the loops and hooks engaged to tension the tarpaulin. The crank assembly can then be looked to the box in conventional fashion to "lock up" the roller.

In a preferred feature, the hooks are part of a heavy steel bracket that can be bolted to a vertical channel of the box side Wall. The hook can be formed by a downwardly angled and outwardly extending, heavy steel tongue. The individual bracket and hook can thus quickly and inexpensively be replaced, in the event of damage.

In another preferred feature, the loop is formed by a length of steel chain which is pinned at each of its ends to one of a pair of sleeves mounted around the roller, the sleeves being fixed in position by set screws. The sleeves may thus be adjusted in circumferential position so that the loop lies in a vertical plane spaced inwardly of the center of the roller when the latter is in the fully unrolled position. As a result, the loop now lies close to or against the bracket, to ensure that the chain enters the hook opening when the roller is counter-rotated.

The novel assembly is characterized by the following advantages. The hook and chain assembly is not easily damaged, but if this occurs, the parts can easily be removed and repaired by the operator. The system provides improved tightening of the tarp, relative to the prior art systems previously described, because there is less friction between the tarp and box side during the tightening process.

DESCRIPTION OF THE PREFERRED EMBODIMENT

Figure 1:
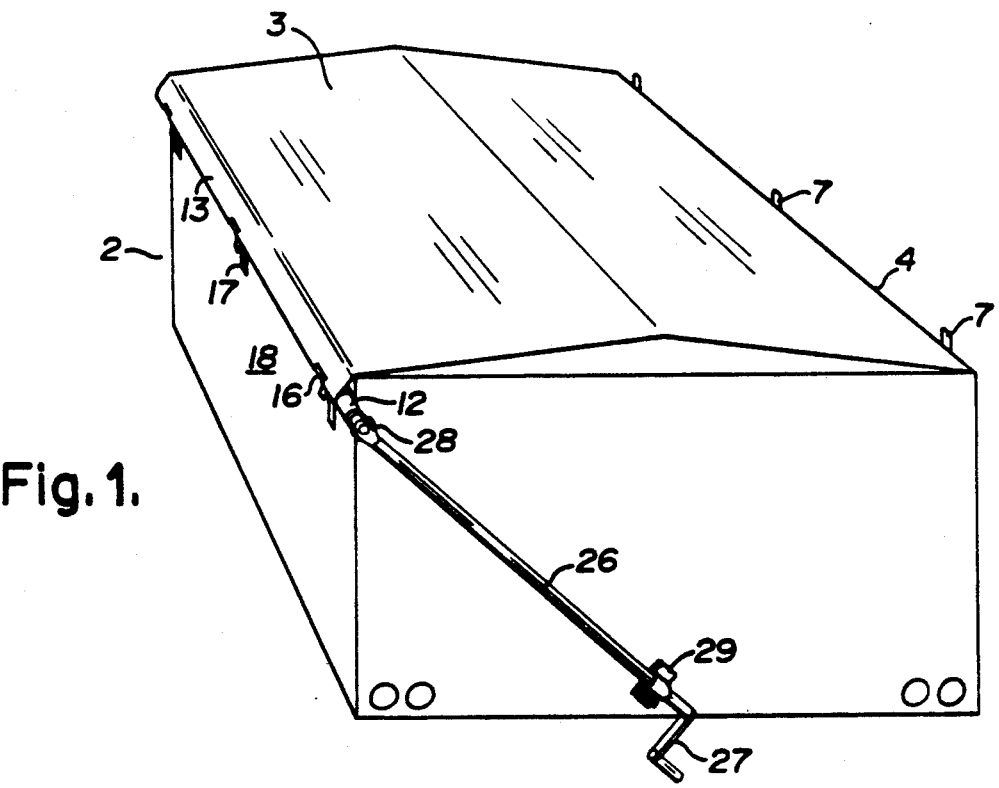
FIG. 1 is a perspective view looking down on a truck box, showing the assembly with the tarpaulin in the closed position.
Figure 2:
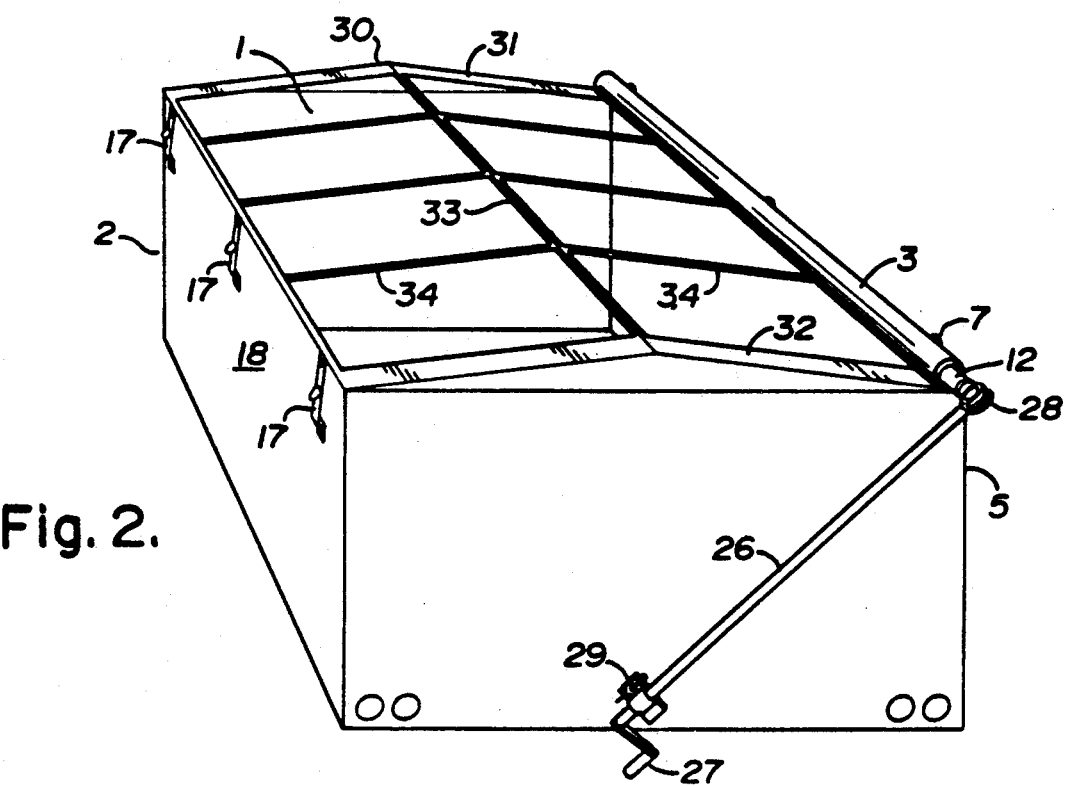
FIG. 2 is a view similar to FIG. 1, showing the tarpaulin in the open position.

Having reference to FIG. 1, the opening 1 of a box 2 is covered by a tarpaulin 3.

The tarpaulin 3 is secured along its first side edge 4 to a first side wall 5 of the box 2. More particularly, the tarpaulin side edge 4 is formed to create a longitudinal sleeve 4a, into which is inserted a rod 6 that is generally co-extensive with the tarpaulin 3. The sleeve 4a and rod 6 are releasably locked against the box side wall 5 by a plate 7. The plate 7 has flat ends 8, 9 and a semi-circular central portion 10. The lower flat end 8 of the plate 7 extends down into a U-shaped bracket 11 that is attached to the box wall 5. Thus the bracket 11 locks the plate 7 to the box side wall 5. The semi-circular central portion 10 of the plate 7 extends over the sleeved rod 6 and locks it in place. The other flat end 9 of the plate 7 extends upwardly above the top edge of the box side wall 5, to create a stop for limiting the travel of the roller 12 when it is rolling up the tarpaulin 3.

A track frame 30 supports the roller 12 and tarpaulin 3. The track frame 30 comprises front and rear end frames 31, 32, a central ridge pole 33, and transverse hoops 34.

At its second side edge 13, the tarpaulin 3 forms a second longitudinal sleeve 14. The roller 12 is positioned in the sleeve 14, so that the roller and tarpaulin are attached and rotation of the roller will roll or unroll the tarpaulin therearound. The sleeve 14 is cut away at spaced intervals 15 to bare short sections 16 of the contained roller 12.

A plurality of brackets 17 are bolted to the second side wall 18 of the box 2 in spaced linear alignment along its length, close to its upper side edge. Each bracket 17 has an outwardly and downwardly extending tongue 19 which, with the bracket, forms a hook 20 having an inlet 21.

Figure 3:
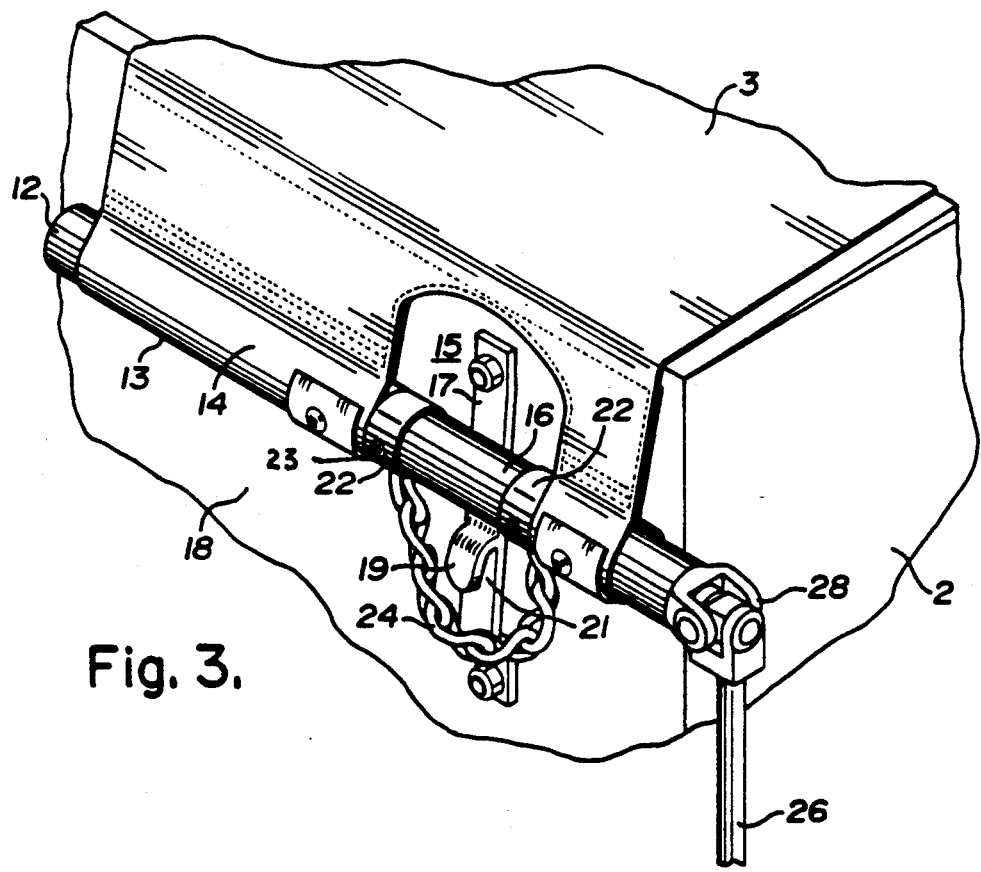
FIG. 3 is a side view showing one of the hook and chain assemblies With the tarpaulin fully unrolled.
Figure 4:
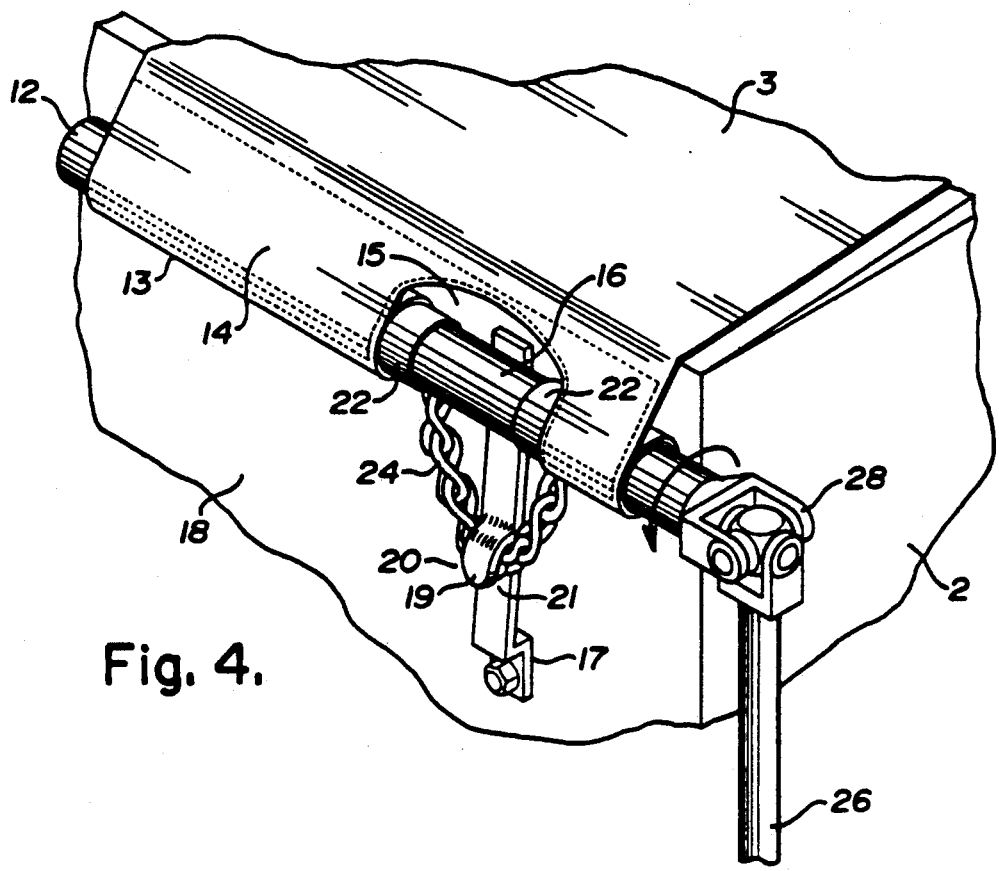
FIG. 4 is a side view similar to FIG. 3, showing the hook and chain engaged after the roller has been reverse-rolled.
Figure 5:
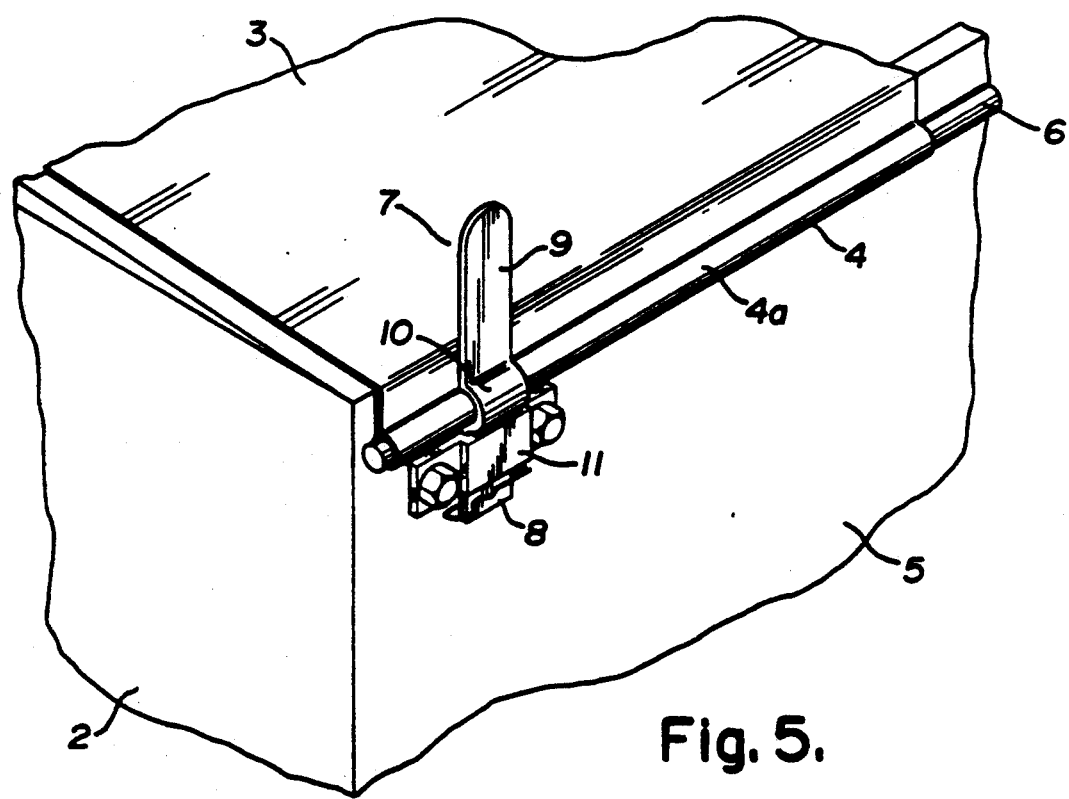
FIG. 5 is a fragmentary perspective view showing the means for securing the tarpaulin to the first side of the box.

The tarpaulin 3 is sized so that, when fully unrolled (as shown in FIG. 3), the roller 12 hangs alongside the box side wall 18 and just above the linear array of hooks 20.

The hooks 20 and bared sections 16 of the roller 12 are vertically aligned so as to correspond.

A pair of collars 22 are mounted about each bared section 16 of the roller 12. The collars 22 are spaced apart a short distance. A set screw 23 extends through each collar 22, for locking it to the roller 12. If the set screw 23 is unlocked, the collar can be rotated about the roller.

A length or loop 24 of chain is secured at its ends to the pair of collars 22 mounted to each roller section 16. Each loop 24 depends from its associated collars 22 and, when the tarpaulin 3 is fully unrolled, the bottom of each loop 24 is positioned just beneath the inlet 21 of its corresponding hook 20. The set screws 23 and collars 22 can be adjusted to locate the attachment points for the chain ends just to the inside of the center of the roller 12. Thus the loops 24 can be well positioned in alignment with the inlets 21 of the corresponding hooks 20.

A conventional crank assembly 26 is connected to the rear end of the roller 12. The crank 27 of the assembly 26 can be manually actuated to rotate the roller 12 through a splined universal joint 28. The crank assembly 26 can be bent at the joint 28 to bring the crank 27 into locking relationship with a bracket 29 secured to the box 2.

In operation, when the roller 12 is in the fully unrolled position and is reverse-rolled in a counter-clockwise direction, it will raise the loops 24 into locking engagement with the hooks 20 Once the loops 24 tighten against the hooks 20, additional rotation of the crank 27 and roller 12 will tighten the tarpaulin 3 against the track frame 30 and box 2. The crank assembly 26 can then be bent and the crank 27 locked in the bracket 29, thereby "locking up" the roller 12 and taut tarpaulin 3.

THE EMBODIMENTS OF THE INVENTION IN WHICH AN EXCLUSIVE PROPERTY OR PRIVILEGE IS CLAIMED ARE DEFINED AS FOLLOWS:

1. An assembly for alternatively rolling or unrolling a generally rectangular tarpaulin to correspondingly uncover or tautly cover the top opening of an open-topped box having first and second side walls, said tarpaulin being secured along its first side edge to the first side wall of the box, said assembly comprising:

a plurality of downwardly opening hooks attached to the second side wall of the box at points spaced along the length of the wall, each hook having a downwardly directed inlet;

a roller secured to the tarpaulin along its second side edge, said roller being operative to roll up the tarpaulin therearound when rotated in one direction and to unroll the tarpaulin when rotated in the opposite direction;

the hooks, roller and tarpaulin along its second side the roller hangs alongside the box second side wall in close proximity to the hooks when the tarpaulin is fully unrolled;

a plurality of loops attached to the roller so as to depend therefrom at points spaced along its length, said loops corresponding in location with the hooks, each loop being adapted to extend below the corresponding hook when the tarpaulin is fully unrolled to position the lower end of the loop beneath and in alignment with the hook inlet so that, if the roller is reverse-rolled from the fully unrolled position, the roller will raise the loop ends through the hook inlets and bring them into restraining engagement with the hooks, whereby the tarpaulin may be tensioned by additional reverse-rolling; and a crank assembly attached to one end of the roller, for inducing rotation of the roller, said crank assembly being adapted to be locked to the box to look the loops and tarpaulin to the hooks in an engaged state.

* * * * *

UNITED STATES PATENT AND TRADEMARK OFFICE
CERTIFICATE OF CORRECTION

PATENT NO. : 5,180,203
DATED      : January 19, 1993
INVENTOR(S): John W. Goudy

It is certified that error appears in the above-identified patent and that said Letters Patent is hereby corrected as shown below:

Column 2, Line 17, after "the" insert --hooks.--;

Column 4, Line 40, delete "along its second side" and insert --being arranged so that--;

Line 58, delete "look" and insert --lock--.

Signed and Sealed this

Thirtieth Day of November, 1993

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,180,203
DATED : January 19, 1993
INVENTOR(S) : John W. Goudy

It is certified that error appears in the above-indentified patent and that said Letters Patent is hereby corrected as shown below:

```
Column 1, Line 39, delete "look" and insert --lock--;
         Line 44, delete "14";
         Line 57, delete "looked" and insert --locked--;

Column 2, Line 10, after "the" insert --box,--;
         Line 12, after "downwardly" insert --directed.--;

Line 24, delete "one" and insert --once--;
         Line 28, delete "looked" and insert --locked--;
         Line 32, delete "Wall" and insert --wall--;
         Line 65, delete "With" and insert --with--;

Column 4, Line 14, after "20" insert --.--;

insert --being arranged so that--;
```

Signed and Sealed this

Twenty-ninth Day of March, 1994

Attest:

BRUCE LEHMAN

*Attesting Officer*   Commissioner of Patents and Trademarks